United States Patent
Wang (10) Patent No.: US 9,578,163 B2
(45) Date of Patent: Feb. 21, 2017

(54) ELECTRONIC DEVICE AND METHOD THEREOF FOR CALLING PHONE NUMBER

(71) Applicants: HISENSE MOBILE COMMUNICATIONS TECHNOLOGY CO., LTD., Qingdao (CN); HISENSE USA CORPORATION, Suwanee, GA (US); Hisense International Co., Ltd., Qingdao (CN)

(72) Inventor: Xiaoxian Wang, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

(*) Notice: Subject to any disclaimer, the term of this patent is extended or adjusted under 35 U.S.C. 154(b) by 0 days.

(21) Appl. No.: 14/665,255

(22) Filed: Mar. 23, 2015

(65) Prior Publication Data

US 2016/0134749 A1 May 12, 2016

(30) Foreign Application Priority Data

Nov. 7, 2014 (CN) .......................... 2014 1 0624666

(51) Int. Cl.
*H04M 3/42* (2006.01)
*H04W 4/16* (2009.01)
*H04W 4/02* (2009.01)

(52) U.S. Cl.
CPC ............... *H04M 3/42* (2013.01); *H04W 4/027* (2013.01); *H04W 4/16* (2013.01)

(58) Field of Classification Search
CPC ........... H04M 3/42; H04W 4/027; H04W 4/16
USPC ....................................................... 455/414.1
See application file for complete search history.

(56) References Cited

U.S. PATENT DOCUMENTS

2013/0065569 A1* 3/2013 Leipzig ................... H04W 8/22
455/416
2014/0323120 A1* 10/2014 Kim ....................... H04W 4/005
455/419

* cited by examiner

*Primary Examiner* — Tanmay Shah
(74) *Attorney, Agent, or Firm* — Harness, Dickey & Pierce, P.L.C.

(57) ABSTRACT

The present disclosure disclose an electronic device and a method thereof for calling a phone number, and the method includes: judging whether a component of a gravitational acceleration of the electronic device in a preset direction is more than or equal to a first threshold after a program installed on the electronic device is started; detecting an object in front of the electronic device at a distance from the electronic device, which is less than or equal to a second threshold when the component of the gravitational acceleration of the electronic device in the preset direction is more than or equal to the first threshold; and calling the phone number automatically when there is an object in front of the electronic device at a distance from the electronic device, which is less than or equal to the second threshold.

14 Claims, 3 Drawing Sheets

ELECTRONIC DEVICE AND METHOD THEREOF FOR CALLING PHONE NUMBER

CROSS-REFERENCE TO RELATED APPLICATION

This application claims the benefit and priority of Chinese Patent Application No. 201410624666.4 filed Nov. 7, 2014. The entire disclosure of the above application is incorporated herein by reference.

FIELD

The present disclosure relates to the field of communications, and particularly to an electronic device and a method thereof for calling a phone number.

BACKGROUND

This section provides background information related to the present disclosure which is not necessarily prior art.

Electronic devices have been increasingly used in daily life of people, and functions of the electronic device are also evolving to become more intelligent, along with the development of communication technologies.

In order to reduce the complexity of operations of the electronic device being used, the existing electronic device is also evolving to become more automated, to simplify user operations and improve the user experience.

SUMMARY

This section provides a general summary of the disclosure, and is not a comprehensive disclosure of its full scope or all of its features.

In a first aspect, an embodiment of the present disclosure provides a method for calling a phone number, the method including:

judging whether a component of a gravitational acceleration of the electronic device in a preset direction is more than or equal to a first threshold, after a program installed on the electronic device is started, herein the program includes phone numbers, and the preset direction is the direction of a radial ray extending from the end of the electronic device, where an earphone is positioned, to the end of the electronic device where a speaker is positioned, and the radial ray is parallel with a side of a screen of the electronic device;

detecting whether there is an object, in front of the electronic device, at a distance less than or equal to a second threshold from the electronic device, when the component of the gravitational acceleration of the electronic device in the preset direction is more than or equal to the first threshold; and calling the phone number automatically, when there is an object, in front of the electronic device, at a distance less than or equal to the second threshold from the electronic device.

In a second aspect, an embodiment of the present disclosure provides an electronic device including:

one or more processors; and
one or more computer readable memories, herein:
there are instruction codes stored in the one or more computer readable memories, and the instruction codes are executed by the one or more processors to implement:

a first detecting module, configured to judge whether a component of a gravitational acceleration of the electronic device in a preset direction is more than or equal to a first threshold, after a program installed on the electronic device is started, herein the program includes phone numbers, and the preset direction is the direction of a radial ray extending from the end of the electronic device, where an earphone is positioned, to the end of the electronic device where a speaker is positioned, and the radial ray is parallel with a side of a screen of the electronic device;

a second detecting module, configured to detect whether there is an object, in front of the electronic device, at a distance less than or equal to a second threshold from the electronic device, when the first detecting module judges that the component of the gravitational acceleration of the electronic device in the preset direction is more than or equal to the first threshold, and to trigger a calling module when there is an object in front of the electronic device at a distance less than or equal to the second threshold from the electronic device; and the calling module configured to be triggered to call the phone number automatically.

In another aspect, an embodiment of the present disclosure provides a method for an electronic device to call a phone number, the method including:

measuring, by the electronic device, a distance between an object in front of the electronic device and the electronic device while first program installed on the electronic device is operating in the foreground; and if the distance is less than or equal to a second value, then calling the phone number automatically.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In order to describe more clearly the technical solutions according to embodiments of the present disclosure or in the prior art, the drawings to which reference is made in the description of the embodiments will be described below briefly, and evidently, the drawings described below are merely illustrative of some of embodiments of the present disclosure, and those ordinarily skilled in the art can derive other drawings from these drawings without any inventive effort. In the drawings.

DETAILED DESCRIPTION

The technical solutions according to an embodiment of the present disclosure will be described below clearly and fully, with reference to the drawings in embodiments of the present disclosure, and apparently the embodiments as described are merely a part but not all of embodiments of the present disclosure. All the other embodiments which can occur to those ordinarily skilled in the art from the embodiments here of the present disclosure without any inventive effort shall fall into the scope of the present disclosure as claimed.

In one embodiment of the present disclosure, a method for an electronic device to call a phone number includes: measuring, by the electronic device, the distance between an object in front of the electronic device and the electronic device, while first program installed on the electronic device is operating in the foreground; and if the distance is less than or equal to a second value, calling the phone number automatically.

In another embodiment of the present disclosure, further to the embodiment above, the method includes detecting whether a component of a gravitational acceleration of the electronic device in a first direction is more than or equal to a first threshold, herein the first program includes phone numbers; and when the component of the gravitational acceleration of the electronic device in the first direction is more than or equal to the first threshold, the electronic device calls the phone number automatically, upon detecting that the distance between the object in front of the electronic device and the electronic device is less than or equal to the second value.

The first threshold may be a critical value of the gravitational acceleration in the first direction of the electronic device, when the electronic device is in a position for calling a phone number. Optionally, the first threshold may be a value set according to the practical scenario, and will not be limited thereto.

Operating in the foreground may refer to a current window being focused on the first program, and on the contrary, operating in the background refers to, for example, the window of the first program being minimized or hidden. The first program may include an address book, a call record, short messaging or other program. The distance may be measured by using an existing distance sensor.

The first direction may be a preset direction, e.g., a direction extending from the end of the electronic device where an earphone is positioned, to the end of the electronic device where a speaker is positioned, and the first direction is parallel with a side of a screen of the electronic device.

An embodiment of the present disclosure provides an electronic device including a processor and a memory, herein there are computer readable program codes stored in the memory, and these computer readable program codes are executed by the processor to perform the functions in the embodiments above of the present disclosure.

Figure 1:
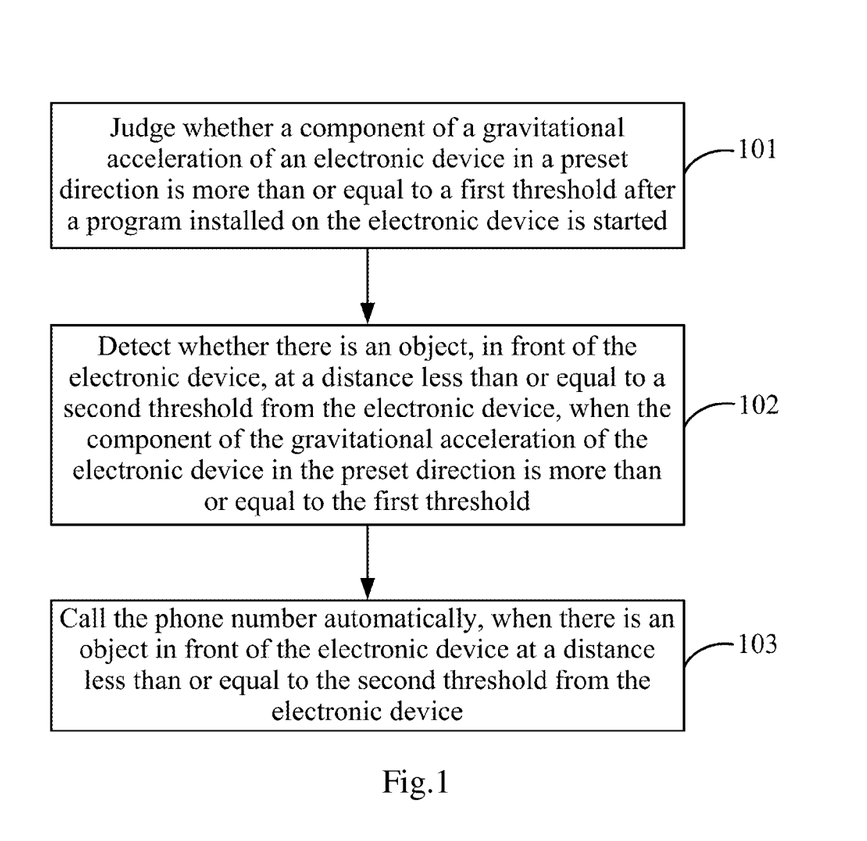
FIG. 1 illustrates a schematic flow chart of a method for calling a phone number according to an embodiment of the present disclosure.

An embodiment of the present disclosure provides a method for calling a phone number, applicable to an electronic device, and in an embodiment of the present disclosure, optionally a handset operating system is installed in the electronic device, e.g., an Android operating system. Optionally, the electronic device may be a smart handset or a tablet computer. The electronic device may alternatively be installed with another handset operating system but will not be limited to an Android operating system. Referring to FIG. 1, the method for calling a phone number according to this embodiment includes the following operations:

The operation 101 is to judge whether a component of a gravitational acceleration of an electronic device in a preset direction is more than or equal to a first threshold, after a program installed on the electronic device is started.

The program includes phone numbers. Optionally, the program may be a preset program in the electronic device. Optionally, the program may be an address book or short messaging program, taking a smart handset as an example. This embodiment is merely illustrative but will not be intended to limit the present disclosure thereto.

Figure 2:
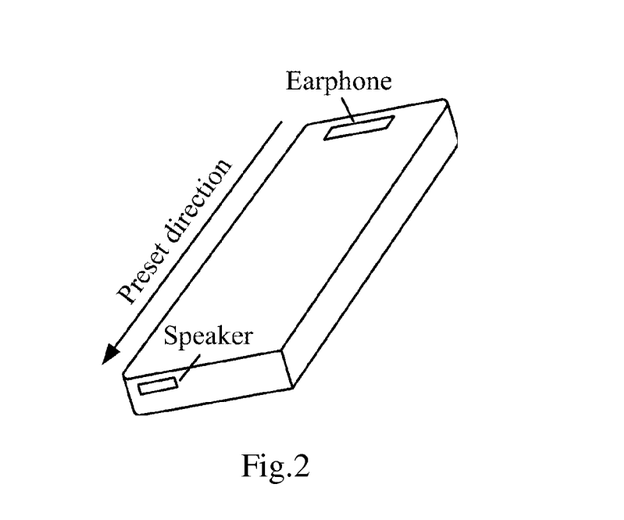
FIG. 2 illustrates a schematic diagram of a preset direction indicator according to an embodiment of the present disclosure.

The preset direction may be a preset direction, e.g., the direction of a radial ray extending from the end of the electronic device, where an earphone is positioned, to the end of the electronic device where a speaker is positioned, and the radial ray is parallel with a side of a screen of the electronic device, and optionally taking a smart handset as an example and referring to FIG. 2, the earphone and the speaker of the smart handset are as typically disposed respectively on the top and the bottom of the handset, so optionally the preset direction is the direction of a radical ray, extending from the top to the bottom, parallel to a longer side of the screen of the smart handset.

The first threshold may be a critical value of the component of the gravitational acceleration in the preset direction of the electronic device, when the electronic device is in a position for calling a phone number, and the value of the first threshold may be set according to practical conditions. In an embodiment of the present disclosure, optionally the first threshold may be 6 $m/s^2$. When the component of the gravitational acceleration in the preset direction of the electronic device is equal to 9.8 $m/s^2$ (the value of the gravitational acceleration is a common value of the acceleration of a freely-falling body), the preset direction is the same as the direction of the gravitational force, and taking a smart handset as an example, when the smart handset is placed vertically, the component of the gravitational acceleration in the preset direction is 9.8 $m/s^2$, and when the component of the gravitational acceleration of the smart handset in the preset direction is more than or equal to the first threshold, it indicates a small angle between the preset direction of the smart handset and the forward direction of the gravitational acceleration, which suggests that the smart handset is substantially vertically placed, that is, the earphone faces upward and the speaker faces downward just as the smart handset is typically positioned for a user to make a call.

The operation 102 is to detect whether there is an object, in front of the electronic device, at a distance less than or equal to a second threshold from the electronic device, when the component of the gravitational acceleration of the electronic device in the preset direction is more than or equal to the first threshold.

In connection with the description of the operation 101, taking a smart handset as an example, when the component of the gravitational acceleration of the smart handset in the preset direction is more than or equal to the first threshold, the handset may be determined, when the electronic device is in a position for calling a phone number, and at this time an object, in front of the smart handset, at a distance less than or equal to the second threshold from the smart handset, is detected, and in an embodiment of the present disclosure, optionally an object approaching the smart handset may be detected by transmitting and receiving a signal or by detecting the intensity of a light through an optical sensor. The present disclosure will not be limited as to how an object approaching the handset is detected. The particular vale of the second threshold may also be set according to the practical condition, and optionally may be set to be a distance between the handset and the head of a user while the user is listening to a call.

The operation 103 is to call the phone number automatically, when there is an object in front of the electronic device at a distance less than or equal to the second threshold from the electronic device.

Optionally when there is an object in front of the electronic device at a distance less than or equal to the second threshold from the electronic device, the phone number currently displayed on the screen of the electronic device is called automatically. For example, in a practical application, a user may select some contact in an address book and then place the smart handset nearby his or her ear, and then the smart handset may automatically call the phone number of the currently displayed contact.

In the method for calling a phone number according to an embodiment of the present disclosure, firstly it is determined that the program including phone numbers is started, secondly the component of the gravitational acceleration in the preset direction is measured, to determine that the electronic device is currently positioned in a position for the user to make a call, and thirdly an approaching object in front of the electronic device is detected, to determine that the electronic device is positioned in a position for the user to listen to a call, and the currently displayed phone number will be called automatically by the electronic device, only if all of these conditions are satisfied, thus alleviating such a situation that if a call is made automatically once there is a blocking object in front of the handset, a mis-operation may occur.

Figure 3:
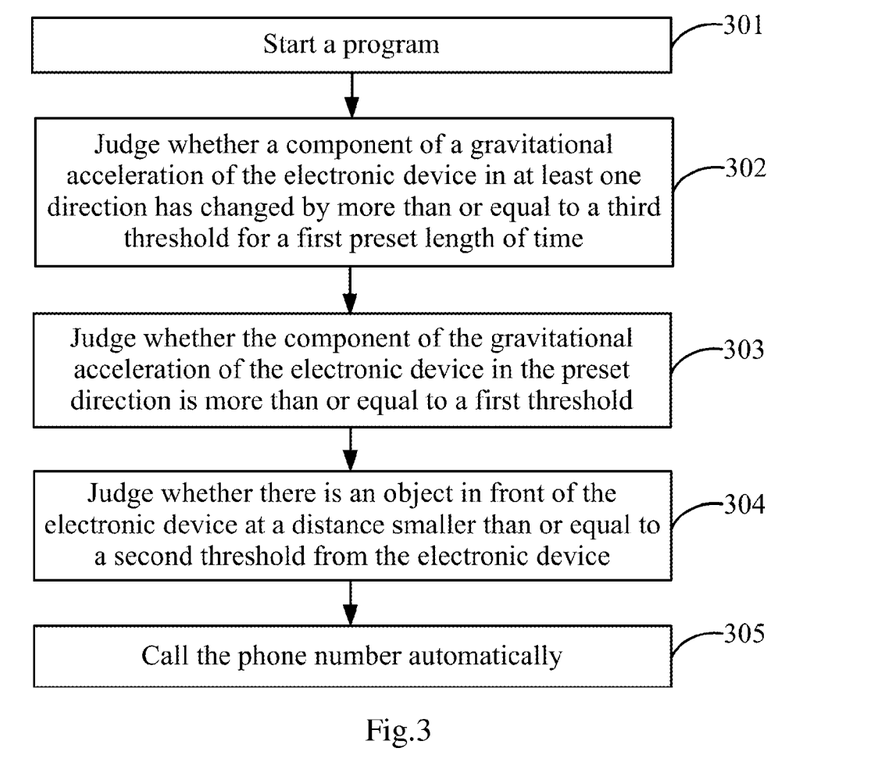
FIG. 3 illustrates a schematic flow chart of a method for calling a phone number according to an embodiment of the present disclosure.

Further to the embodiment corresponding to FIG. 1 above, another embodiment of the present disclosure provides a method for calling a phone number, applicable to an electronic device. Optionally the electronic device is installed with a handset operating system, e.g., an Android operating system. Optionally the electronic device may be a smart handset or a tablet computer. The electronic device may alternatively be installed with another handset operating system but will not be limited to an Android operating system. This embodiment will be described by taking as an example a smart handset installed with an Android operating system, and this embodiment is merely illustrative but will not be intended to limit the present disclosure thereto. Referring to FIG. 3, the method for calling a phone number according to this embodiment includes:

The operation 301 is to start a program.

The program includes phone numbers. Optionally, the program may be a preset program in the electronic device. Optionally the program in the smart handset may be an address book or short messaging program.

The operation 302 is to judge whether a component of a gravitational acceleration of the electronic device in at least one direction has changed by more than or equal to a third threshold in a first preset length of time.

Optionally it is judged whether a component of the gravitational acceleration of the electronic device on the x axis, a component of the gravitational acceleration on the y axis, and a component of the gravitational acceleration on the z axis, in a preset coordinate system have all changed by more than or equal to the third threshold in the first preset length of time.

The origin of the preset coordinate system is any point, and optionally the top left corner of a screen of the electronic device is the origin of the preset coordinate system, the y axis of the preset coordinate system is a straight line on which a radical ray, extending in the preset direction, passing the origin of the preset coordinate system lies, and the forward direction of the y axis is the preset direction; the x axis of the preset coordinate system is a straight line, passing the origin of the preset coordinate system, perpendicular to the y axis in a plane where the screen of the electronic device lies, and the forward direction of the x axis is the direction of a radical ray extending, perpendicular to the y axis, from the origin of the preset coordinate system along a side of the screen of the electronic device; and the z axis of the preset coordinate system is a straight line, perpendicular to the plane where the screen of the electronic device lies, passing the origin of the preset coordinate system, and the forward direction of the z axis is the direction of a radical ray extending below the screen of the electronic device along the z axis.

Figure 4:
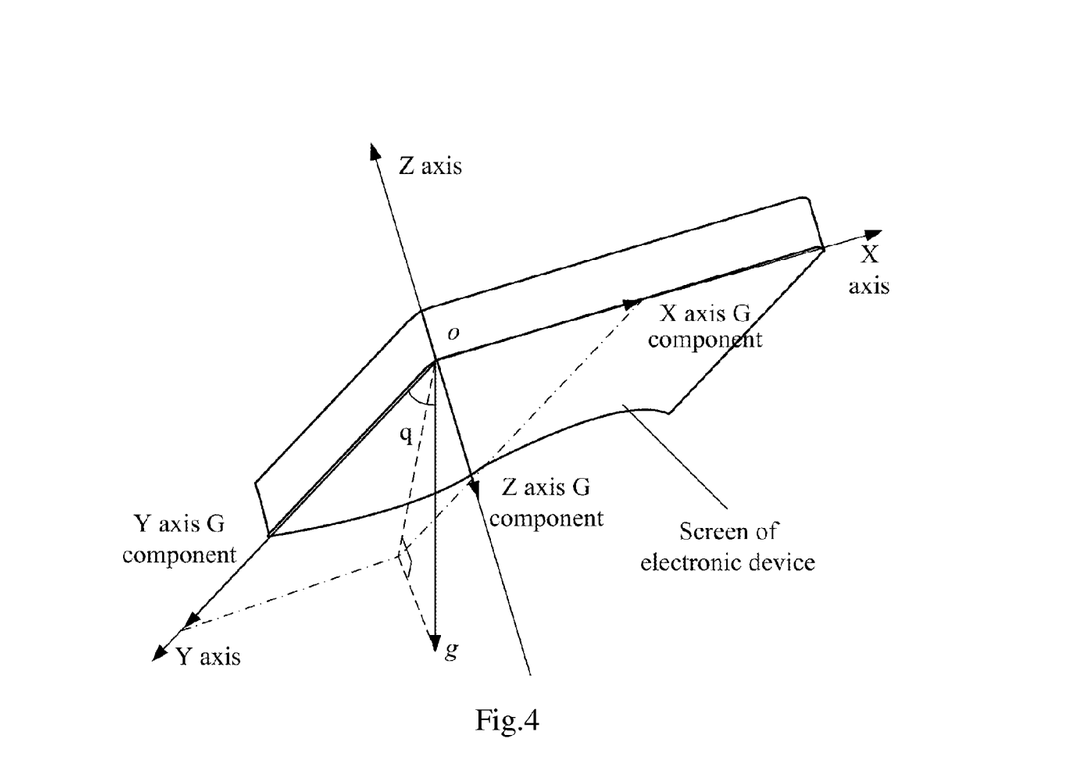
FIG. 4 illustrates a schematic diagram of a preset coordinate system according to an embodiment of the present disclosure.

Optionally taking a smart handset as an example, typically an earphone of the smart handset is disposed at the top, and a speaker thereof is disposed at the bottom. As illustrated in FIG. 4, the origin of the preset coordinate system may be the top left corner of a screen of the smart handset, the x axis is a straight line on which a shorter side of the smart handset passing the origin lies, the y axis is a straight line on which a longer side of the smart handset passing the origin lies, and the z axis is a straight line, perpendicular to a plane where the screen of the smart handset lies, passing the origin.

Optionally the first preset length of time may be 0.1 second, and the third threshold may be 1 $m/s^2$, and when the component of the gravitational acceleration of the electronic device on the x axis, the component of the gravitational acceleration on the y axis, and the component of the gravitational acceleration on the z axis, in the preset coordinate system have all changed by more than or equal to the third threshold in the first preset length of time, it indicates that the handset is moving, and the position of the handset has significantly changed, which is in consistent with the situation that the user holds the handset proximate to his or her ear to listen to a call. The x axis, the y axis and the z axis are merely illustrative here, and it may alternatively only judge whether the component of the gravitational acceleration in any one direction has changed by more than or equal to the third threshold in the first preset length of time, or it may alternatively judge whether the components of the gravitational acceleration in multiple directions have changed by more than or equal to the third threshold in the first preset length of time, although the present disclosure will be limited in this regard.

Optionally the judgment may be made by using a gravitational acceleration sensor, and the gravitational acceleration sensor is started for the judgment after the program is started. Optionally, the program may be a preset program in the electronic device.

The operation 303 is performed, when the component of the gravitational acceleration of the electronic device on the x axis, the component of the gravitational acceleration on the y axis, and the component of the gravitational acceleration on the z axis, in the preset coordinate system have changed by more than or equal to the third threshold in the first preset length of time.

The operation 303 is to judge whether the component of the gravitational acceleration of the electronic device in the preset direction is more than or equal to a first threshold.

Optionally in connection with the preset coordinate system as illustrated in FIG. 3 in the operation 302, o represents the origin in FIG. 3, and taking a smart handset as an example, the forward direction of the y axis is the preset direction, so the component of the gravitational acceleration on the y axis may be detected and recorded, and it may judge whether the component of the gravitational acceleration on the y axis is more than the first threshold. Optionally the judgment may be made by using a gravitational acceleration sensor, and optionally the gravitational acceleration sensor is stopped, when the component of the gravitational acceleration of the electronic device in the preset direction is more than or equal to the first threshold or the program is stopped. Optionally, the program may be a preset program in the electronic device.

Optionally, referring to FIG. 4, an angle between the forward direction of the y axis and the forward direction of the gravitational acceleration may be calculated in the equation of arccos $\theta = g_y/g$, herein $\theta$ represents the angle between the forward direction of the y axis and the forward direction of the gravitational acceleration, $g_y$ represents the component of the gravitational acceleration on the y axis, g represents the constant 9.8 m/s² of the gravitational acceleration, and when the component of the gravitational acceleration on the y axis is more than or equal to the first threshold, it indicates a small angle between the forward direction of the y axis of the smart handset and the forward direction of the gravitational acceleration, which suggests that the smart handset is substantially vertically placed, that is, an earphone faces upward and a speaker faces downward just as the smart handset is typically positioned for a user to make a call. Optionally the first threshold may be 6 m/s² or 7 m/s², and the first threshold may be set particularly as needed. Optionally, $\theta$ angle satisfying the needs may be determined in the equation of arccos $\theta = g_y/g$ firstly, and then $g_y$ may be calculated as the first threshold, and the value of the first threshold will not be limited in the present disclosure.

The operation 304 is performed when the component of the gravitational acceleration of the electronic device in the preset direction is more than or equal to the first threshold.

The operation 304 is to judge whether there is an object in front of the electronic device at a distance smaller than or equal to a second threshold from the electronic device.

Optionally, before the judgment, the distance between the object in front of the electronic device and the electronic device may be measured firstly. Optionally the distance between the object in front of the electronic device and the electronic device may be measured in a second preset length of time, and an object in front of the electronic device at a distance from the electronic device is detected in an embodiment as follows:

A preset signal is transmitted, in the direction of a radical ray extending above the screen of the electronic device, perpendicular to the screen of the electronic device, and the returned preset signal is received in the same direction, a transmission time and a reception time of the preset signal are recorded, the preset signal will be returned along an original path upon being blocked by an object. Optionally the preset signal may be an infrared signal; and the preset signal will not be limited to any particular form in this embodiment, and the second preset length of time may not be set; and The distance between the object encountered by the preset signal and the electronic device may be calculated, according to a transmission speed of the preset signal, and the transmission time and the reception time of the preset signal.

Optionally the distance s between the object encountered by the preset signal and the electronic device may be calculated in the equation of $s = v(t_2 - t_1)$, herein v represents the transmission speed of the preset signal, $t_2$ represents the time at which the preset signal is received, and $t_1$ represents the time at which the preset signal is transmitted.

It may judge whether there is an object in front of the electronic device at a distance smaller than or equal to the second threshold from the electronic device, by judging whether the distance between the object encountered by the preset signal and the electronic device is smaller than or equal to the second threshold.

Optionally when the component of the gravitational acceleration of the electronic device in the preset direction is larger than or equal to the first threshold, a distance sensor is started, to detect an object in front of the electronic device at a distance smaller than or equal to the second threshold from the electronic device. Optionally the distance sensor may be started for a second preset length of time, and optionally the second preset length of time may be 0.5 second. The second preset length of time will not be limited to any particular value in the present disclosure.

Taking 0.5 second as an example, when the component of the gravitational acceleration of the electronic device in the preset direction is larger than or equal to the first threshold, the distance sensor is started for 0.5 second, that is, the preset signal is transmitted continuously for 0.5 second, to judge whether there is an object in front of the electronic device at a distance smaller than or equal to the second threshold from the electronic device, and the judgment continues for the second preset length of time, i.e., 0.5 second, or the judgment is stopped when the electronic device calls a phone number.

Optionally the operation 302 and the operation 303 may be performed in the following program codes in an Android operating system.

```
// Gravitational acceleration sensor algorithm
publicvoid onSensorChang ed(SensorEvent event) {//When the
sensor is changed
    if (event.sensor.g etType( ) ==
    Sensor.TYPE_ACCELEROMETER) {
    //If the gravitational acceleration sensor is changed
        float[ ] values = event.values;
        if (Math.abs(values[0] − xvalue) > 1||
            Math.abs(values[1] − yvalue) > 1) {
            yvalue = values[1];
            xvalue = values[0];
            xyvalue = Math.abs(xvalue) + Math.abs(yvalue);
        //Read data of the gravitational acceleration sensor in the directions
of the three coordinate axes in the preset coordinate system
            lastaccEvent = System.currentTimeMillis( );
        //Record the current time
            if (!proximityOpen&&yvalue> 6) {
        //If the component of the gravitational acceleration on the y axis is
larger than 6, then it indicates that the handset is substantially vertically
disposed (the first threshold is 6)
                curTime = System.currentTimeMillis( );//The time is
recorded again
                if (lastUpdate == −1 || (curTime −
                lastUpdate) >mCycle) {
        //If this action is performed for a short period of time, then it
indicates an action of normal lifting-up instead of slow shifting
                    lastUpdate = curTime;
                    mSensorManager.reg isterListener
                    (proximityListener,
        proximitySensor,SensorManager.SENSOR_DELAY_NORMAL);
        //The distance sensor is started, to detect an object approaching the
front side of the handset (judge whether the handset is lifted up proximate
to the ear)
                    proximityOpen = true;
                    mHandler.sendEmptyMessageDelayed(0, 500);
```

-continued

```
//The distance sensor is stopped after 0.5 second for power saving.
                }
            }
        }
    }
}
```

The operation 305 is performed when there is an object in front of the electronic device at a distance less than or equal to the second threshold from the electronic device.

The operation 305 is to call the phone number automatically.

Optionally the operation 304 and the operation 305 may be performed particularly in the following program codes in an Android operating system:

```
//Distance sensor algorithm
    SensorEventListener proximityListener = new SensorEventListener( )
    {
        publicvoid onSensorChanged(SensorEvent event) {
            if (event.sensor.getType( ) ==
            Sensor.TYPE_PROXIMITY) {
//If the distance sensor detects a change in data
                value = event.values[SensorManager.DATA_X];
                if (value == 0) {
                    closed = true;
//If the read sensor data is 0, then it indicates an object proximate to
the handset
                }
            }
        }
//It is judged from a result returned by the distance sensor whether to
make a call
    private Handler mHandler = new Handler( ) {
        publicvoid handleMessage(Message msg) {
            try {
mSensorManager.unregisterListener(proximityListener,proximitySensor);
//The distance sensor is stopped
            } catch (NullPointerException e) {
                // TODO: handle exception
            }
            proximityOpen = false;
            if (closed) {
                closed = false;
                if (!capCovered) {
//If the distance sensor detects an approaching object
    Intent intent2 = new Intent("com.hisense.smartgesture.motioncall");
                sendBroadcast(intent2);
//Send a broadcast about making a call
                }
            }
        };
    };
```

In the method for calling a phone number according to an embodiment of the present disclosure, firstly it is determined that the program including phone numbers is started; secondly the component of the gravitational acceleration on the x axis, the component of the gravitational acceleration on the y axis, and the component of the gravitational acceleration on the z axis, in the preset coordinate system are measured to determine that the position of the electronic device has significantly changed, which is consistent with the situation that the user lifts up the handset to listen to a call; thirdly the component of the gravitational acceleration in the preset direction is measured, to determine that the electronic device is currently positioned in a position for the user to make a call; and lastly an approaching object in front of the electronic device is detected, to determine that the electronic device is positioned in a position for the user to listen to a call, and the currently displayed phone number will be called automatically by the electronic device, only if all of the four conditions are satisfied, thus alleviating such a situation that if a call is made automatically once there is a blocking object in front of the handset, a mis-operation may occur. Moreover the components of the gravitational acceleration in the three coordinates axes will be measured only if the program is started, the component of the gravitational acceleration in the preset direction will be detected, only if the components of the gravitational acceleration in the three coordinate axes have all significantly changed in the first preset length of time, it will be judged whether there is an object, in front of the electronic device, at a distance smaller than or equal to the second threshold from the electronic device, only if the component of the gravitational acceleration in the preset direction is larger than or equal to the first threshold, and the judgment only continues for the second preset length of time, and then the judgment will be stopped instead of continuing the judgment, to thereby reduce the amount of consumed power of the handset. Optionally, the program above may be a preset program in the electronic device.

Figure 5:
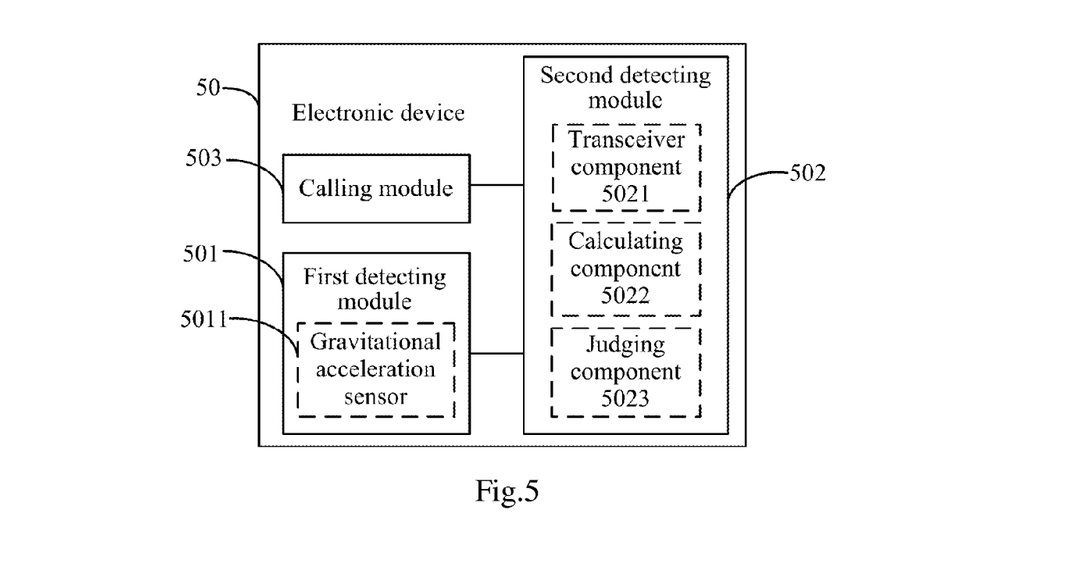
FIG. 5 illustrates a schematic structural diagram of an electronic device according to an embodiment of the present disclosure.

Further to embodiments corresponding to FIG. 1 and FIG. 3 above, an embodiment of the present disclosure provides an electronic device configured to perform the method for calling a phone number as described in the embodiments corresponding to FIG. 1 and FIG. 3 above. Referring to FIG. 5, the electronic device 50 includes one or more processors, one or more computer readable memories, a first detecting module 501, a second detecting module 502 and a calling module 503.

There are instruction codes stored in the one or more computer readable memories above, and the instruction codes are executed by the one or more processors to implement:

The first detecting module 501 is configured to judge whether a component of a gravitational acceleration of the electronic device in a preset direction is more than or equal to a first threshold, after a program installed on the electronic device is started, herein the program includes phone numbers, and the preset direction is the direction of a radial ray extending from the end of the electronic device, where an earphone is positioned, to the end of the electronic device where a speaker is positioned, and the radial ray is parallel with a side of a screen of the electronic device.

Optionally, the program may be a preset program in the electronic device.

The first threshold may be a critical value of the component of the gravitational acceleration in the preset direction of the electronic device, when the electronic device is in a position for calling a phone number. Optionally, the first threshold may be a value set according to the practical scenario, and will not be limited thereto.

The second detecting module 502 is configured to detect whether there is an object in front of the electronic device, at a distance less than or equal to a second threshold from the electronic device, when the first detecting module 501 judges that the component of the gravitational acceleration of the electronic device in the preset direction is more than or equal to the first threshold, and to trigger a calling module when there is an object, in front of the electronic device, at a distance less than or equal to the second threshold from the electronic device.

The calling module 503 is configured to be triggered to call the phone number automatically.

Optionally in a first application scenario, the first detecting module 501 is configured to judge, whether a component of a gravitational acceleration of the electronic device in at least one direction has changed by more than or equal to a third threshold, in a first preset length of time, after the program installed on the electronic device is started, and if the component of the gravitational acceleration of the electronic device in the at least one direction has changed by more than or equal to the third threshold in the first preset length of time, to judge whether the component of the gravitational acceleration of the electronic device in the preset direction is more than or equal to the first threshold.

Optionally the first detecting module 501 is configured to judge whether a component of the gravitational acceleration of the electronic device on the x axis, a component of the gravitational acceleration on the y axis, and a component of the gravitational acceleration on the z axis, in a preset coordinate system have all changed by more than or equal to the third threshold in the first preset length of time, after the program installed on the electronic device is started.

Optionally, the program may be a preset program in the electronic device.

The origin of the preset coordinate system is any point, and the y axis of the preset coordinate system is a straight line on which a radical ray, extending in the preset direction, passing the origin of the preset coordinate system lies, and the forward direction of the y axis is the preset direction. The x axis of the preset coordinate system is a straight line, passing the origin of the preset coordinate system, perpendicular to the y axis in a plane where the screen of the electronic device lies, and the forward direction of the x axis is the direction of a radical ray extending, perpendicular to the y axis, from the origin of the preset coordinate system along the side of the screen of the electronic device. The z axis of the preset coordinate system is a straight line, perpendicular to the plane where the screen of the electronic device lies, passing the origin of the preset coordinate system, and the forward direction of the z axis is the direction of a radical ray extending below the screen of the electronic device along the z axis.

Optionally the first detecting module 501 includes a gravitational acceleration sensor 5011.

The first detecting module 501 is configured to start the gravitational acceleration sensor 5111, after the program installed on the electronic device is started, to judge, through the gravitational acceleration sensor 5111, whether the component of the gravitational acceleration of the electronic device on the x axis, the component of the gravitational acceleration on the y axis, and the component of the gravitational acceleration on the z axis have changed by more than or equal to the third threshold in the first preset length of time, and if the component of the gravitational acceleration on the x axis, the component of the gravitational acceleration on the y axis and the component of the gravitational acceleration on the z axis have all changed by more than or equal to the third threshold in the first preset length of time, to judge, through the gravitational acceleration sensor, whether the component of the gravitational acceleration of the electronic device in the preset direction is more than or equal to the first threshold; and to stop the gravitational acceleration sensor 5111, when the component of the gravitational acceleration of the electronic device in the preset direction is more than or equal to the first threshold or the program is stopped.

Optionally, the program may be a preset program in the electronic device.

Optionally, in a second application scenario, the second detecting module 502 is configured, to detect a distance between the object in front of the electronic device and the electronic device in a second preset length of time, and to stop the detection when the second preset length of time expires or the electronic device calls the phone number.

Optionally the second detecting module 502 includes a transceiver component 5021, a calculating component 5022 and a judging component 5023.

The transceiver component 5021 is configured to transmit a preset signal in the direction of a radical ray extending above the screen of the electronic device, and perpendicular to the screen of the electronic device, and receive the returned preset signal in the same direction, and to record a transmission time and a reception time of the preset signal, herein the preset signal will be returned along an original path upon being blocked by an object.

The calculating component 5022 is configured to calculate the distance between the object encountered by the preset signal and the electronic device, according to a transmission speed of the preset signal, and the transmission time and the reception time of the preset signal recorded by the transceiver component 5021.

The judging component 5023 is configured to judge whether the distance, calculated by the calculating component 5022, between the object encountered by the preset signal and the electronic device is smaller than or equal to the second threshold.

In the electronic device according to this embodiment of the present disclosure, firstly it is determined that the program including phone numbers is started; secondly the component of the gravitational acceleration on the x axis, the component of the gravitational acceleration on the y axis, and the component of the gravitational acceleration on the z axis, in the preset coordinate system are measured, to determine that the position of the electronic device has significantly changed, which is in consistent with the situation that the user lifts up the handset to listen to a call; thirdly the component of the gravitational acceleration in the preset direction is measured to determine that the electronic device is currently positioned just as the electronic device is positioned for a user to make a call; and lastly an approaching object in front of the electronic device is detected to determine that the electronic device is positioned in a positioned for the user to listen to a call, and the currently displayed phone number will be called automatically by the electronic device, only if all of the four conditions are satisfied, thus alleviating such a situation that mis-operations may occur, if a call is made automatically once there is a blocking object in front of the handset. Moreover the components of the gravitational acceleration in the three coordinates axes will be measured only if the program is started, the component of the gravitational acceleration in the preset direction will be detected, only if the components of the gravitational acceleration in the three coordinate axes have all significantly changed in the first preset length of time, it will be judged whether there is an object in front of the electronic device at a distance smaller than or equal to the second threshold from the electronic device, only if the component of the gravitational acceleration in the preset direction is larger than or equal to the first threshold, and the judgment will be made only for the second preset length of time, and then the judgment will be stopped instead of continuous judgment to thereby reduce the amount of consumed power of the handset.

Optionally, the program above may be a preset program in the electronic device.

Those skilled in the art may clearly appreciate from the description of the embodiments above that the present disclosure may be embodied in hardware or firmware or a combination thereof. When the present disclosure is embodied in software, the functions above may be stored in a computer readable medium or as one or more instructions or codes on the computer readable medium for transmission. The computer readable medium may include a computer storage medium and a communication medium, and the communication medium includes any medium to facilitate transmission of computer program from one place to another, and the storage medium may be any available medium accessible to a computer. By way of examples without any limitation thereto, the computer readable medium may include a Random Access Memory (RAM), a Read Only Memory (ROM), an Electrically Erasable Programmable Read Only Memory (EEPROM), a Compact Disc Read Only Memory (CD-ROM) or other optical disc storage mediums, magnetic diskette storage mediums or other magnetic storage devices or any other mediums capable of carrying or storing desirable program codes in the form of instructions or a data structure and being accessible to a computer. Moreover the computer readable medium may be embodied as appropriate as any connection. For example, if the software is transmitted from a website, a server or another remote source over a coaxial cable, an optical fiber cable, a twisted pair, a Digital Subscriber Line (DSL) or wireless technologies, e.g., infrared, radio, microwave, etc., then the coaxial cable, the optical fiber cable, the twisted pair, the DSL or the wireless technologies, e.g., infrared, radio, microwave, etc., are encompassed in the definition of the medium as described. As referred to in the present disclosure, the disc and the diskette include a Compact Disc (CD), a laser disc, an optical disc, a Digital Versatile Disc (DVD), a floppy diskette and a Blue-Ray optical disc, herein typically the diskette reproduces data magnetically, and the disc reproduces data optically with laser. A combination of the examples shall also fall into the scope of the computer readable medium.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for an electronic device to call a phone number, comprising:
    judging whether a component of a gravitational acceleration of the electronic device in a preset direction is more than or equal to a first threshold, after a program installed on the electronic device is started,
    wherein the program comprises phone numbers, and the preset direction is a direction of a radial ray extending from the end of the electronic device, where an earphone is positioned, to the end of the electronic device, where a speaker is positioned, and the radial ray is parallel with a side of a screen of the electronic device;
    detecting whether there is an object in front of the electronic device, at a distance less than or equal to a second threshold from the electronic device, when the component of the gravitational acceleration of the electronic device in the preset direction is more than or equal to the first threshold; and
    calling the phone number automatically, when there is an object, in front of the electronic device, at a distance less than or equal to the second threshold from the electronic device.

2. The method according to claim 1, wherein judging whether the component of the gravitational acceleration of the electronic device in the preset direction is more than or equal to the first threshold, after a program installed on the electronic device is started, comprises:
    judging whether a component of a gravitational acceleration of the electronic device in at least one direction has changed by more than or equal to a third threshold in a first preset length of time, after the program installed on the electronic device is started; and
    if the component of the gravitational acceleration of the electronic device in the at least one direction has changed by more than or equal to the third threshold in the first preset length of time, then judging whether the component of the gravitational acceleration of the electronic device in the preset direction is more than or equal to the first threshold.

3. The method according to claim 2, wherein judging whether the component of the gravitational acceleration of the electronic device in the at least one direction has changed by more than or equal to the third threshold in the first preset length of time, comprises:
    judging whether a component of the gravitational acceleration of the electronic device on the x axis, a component of the gravitational acceleration on the y axis, and a component of the gravitational acceleration on the z axis, in a preset coordinate system have all changed by more than or equal to the third threshold in the first preset length of time,
    wherein the origin of the preset coordinate system is any point, and the y axis of the preset coordinate system is a straight line on which a radical ray, extending in the preset direction, passing the origin of the preset coordinate system lies, and the forward direction of the y axis is the preset direction; the x axis of the preset coordinate system is a straight line, passing the origin of the preset coordinate system, perpendicular to the y axis in a plane where the screen of the electronic device lies, and the forward direction of the x axis is the direction of a radical ray extending, perpendicular to the y axis, from the origin of the preset coordinate system along the side of the screen of the electronic device; and the z axis of the preset coordinate system is a straight line, perpendicular to the plane where the screen of the electronic device lies, passing the origin of the preset coordinate system, and the forward direction of the z axis is the direction of a radical ray extending below the screen of the electronic device along the z axis.

4. The method according to claim 1, wherein before the detecting an object in front of the electronic device at a distance from the electronic device, which is less than or equal to the second threshold, the method comprises:
    detecting a distance between the object in front of the electronic device and the electronic device for a second preset length of time, and stopping the detection when the second preset length of time expires or the electronic device calls the phone number.

5. The method according to claim 1, wherein before the detecting an object in front of the electronic device at a distance from the electronic device, which is less than or equal to the second threshold, the method comprises:

transmitting a preset signal and receiving the returned preset signal, in the direction of a radical ray extending above the screen of the electronic device, and perpendicular to the screen of the electronic device; and recording a transmission time and a reception time of the preset signal, wherein the preset signal will be returned along an original path upon being blocked by an object; and calculating the distance between the object encountered by the preset signal and the electronic device, according to a transmission speed of the preset signal, and the transmission time and the reception time of the preset signal; and the detecting an object in front of the electronic device at a distance from the electronic device, which is less than or equal to the second threshold comprises:

judging whether the distance between the object encountered by the preset signal and the electronic device is smaller than or equal to the second threshold.

6. The method according to claim 1, wherein the first threshold is a critical value of the component of the gravitational acceleration in the preset direction of the electronic device, when the electronic device is in a position for calling a phone number.

7. An electronic device, comprising:
one or more processors; and
one or more nonvolatile computer readable memories, wherein:
instruction codes are stored in the one or more nonvolatile computer readable memories, and the instruction codes are executed by the one or more processors to implement:
a first detecting module, configured to judge whether a component of a gravitational acceleration of the electronic device in a preset direction is more than or equal to a first threshold, after a program installed on the electronic device is started, wherein the program includes phone numbers, and the preset direction is a direction of a radial ray extending from the end of the electronic device, where an earphone is positioned, to the end of the electronic device where a speaker is positioned, and the radial ray is parallel with a side of a screen of the electronic device;
a second detecting module, configured to detect whether there is an object, in front of the electronic device, at a distance less than or equal to a second threshold from the electronic device, when the first detecting module judges that the component of the gravitational acceleration of the electronic device in the preset direction is more than or equal to the first threshold, and to trigger a calling module when there is an object in front of the electronic device at a distance less than or equal to the second threshold from the electronic device; and
the calling module configured to be triggered to call the phone number automatically.

8. The device according to claim 7, wherein:
the first detecting module is configured to judge whether a component of a gravitational acceleration of the electronic device in at least one direction has changed by more than or equal to a third threshold for a first preset length of time, after the program installed on the electronic device is started, and if the component of the gravitational acceleration of the electronic device in the at least one direction has changed by more than or equal to the third threshold in the first preset length of time, to judge whether the component of the gravitational acceleration of the electronic device in the preset direction is more than or equal to the first threshold.

9. The device according to claim 8, wherein:
the first detecting module is configured to judge whether a component of the gravitational acceleration of the electronic device on the x axis, a component of the gravitational acceleration on the y axis, and a component of the gravitational acceleration on the z axis, in a preset coordinate system have all changed by more than or equal to the third threshold in the first preset length of time, after the program installed on the electronic device is started,
wherein the origin of the preset coordinate system is any point, and the y axis of the preset coordinate system is a straight line on which a radical ray, extending in the preset direction, passing the origin of the preset coordinate system lies, and the forward direction of the y axis is the preset direction; the x axis of the preset coordinate system is a straight line, passing the origin of the preset coordinate system, perpendicular to the y axis in a plane where the screen of the electronic device lies, and the forward direction of the x axis is the direction of a radical ray extending, perpendicular to the y axis, from the origin of the preset coordinate system along the side of the screen of the electronic device; and the z axis of the preset coordinate system is a straight line, perpendicular to the plane where the screen of the electronic device lies, passing the origin of the preset coordinate system, and the forward direction of the z axis is the direction of a radical ray extending below the screen of the electronic device along the z axis.

10. The device according to claim 7, wherein:
the second detecting module is configured to detect a distance between the object in front of the electronic device and the electronic device for a second preset length of time and to stop the detection when the second preset length of time expires or the electronic device calls the phone number.

11. The device according to claim 7, wherein the second detecting module comprises a transceiver component, a calculating component and a judging component, wherein:
the transceiver component is configured, to transmit a preset signal and receive the returned preset signal, in the direction of a radical ray extending above the screen of the electronic device, perpendicular to the screen of the electronic device, and to record a transmission time and a reception time of the preset signal, wherein the preset signal will be returned along an original path upon being blocked by an object;
the calculating component is configured to calculate the distance between the object encountered by the preset signal and the electronic device according to a transmission speed of the preset signal, and the transmission time and the reception time of the preset signal recorded by the transceiver component; and
the judging component is configured to judge whether the distance, calculated by the calculating component, between the object encountered by the preset signal and the electronic device is smaller than or equal to the second threshold.

12. The device according to claim 7, wherein the first threshold is a critical value of the component of the gravitational acceleration in the preset direction of the electronic device, when the electronic device is in a position for calling a phone number.

13. A method for an electronic device to call a phone number, the method comprising:
- measuring, by the electronic device, a distance between an object in front of the electronic device and the electronic device, while a first program installed on the electronic device is operating in the foreground;
- judging whether a component of a gravitational acceleration of the electronic device in a first direction is more than or equal to a first threshold, wherein the first program comprises phone numbers; and
- when the component of the gravitational acceleration of the electronic device in the first direction is more than or equal to the first threshold, calling, by the electronic device, the phone number automatically, upon judging that the distance between the object in front of the electronic device and the electronic device is less than or equal to the second value.

14. The method according to claim 13, wherein the first threshold is a critical value of the gravitational acceleration in the first direction of the electronic device, when the electronic device is in a position for calling a phone number.

* * * * *

UNITED STATES PATENT AND TRADEMARK OFFICE
CERTIFICATE OF CORRECTION

PATENT NO. : 9,578,163 B2  
APPLICATION NO. : 14/665255  
DATED : February 21, 2017  
INVENTOR(S) : Xiaoxian Wang Page 1 of 1

It is certified that error appears in the above-identified patent and that said Letters Patent is hereby corrected as shown below:

In the Drawings

Sheet 1, Fig. 2, replace "Speaker" with --Microphone--.

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*